United States Patent [19]

Jue

[11] Patent Number: 4,655,548
[45] Date of Patent: Apr. 7, 1987

[54] MULTI-DEGREE OF FREEDOM MOUNT

[75] Inventor: Suey Jue, Hicksville, N.Y.

[73] Assignee: Grumman Aerospace Corporation, Bethpage, N.Y.

[21] Appl. No.: 663,307

[22] Filed: Oct. 22, 1984

[51] Int. Cl.$^4$ .............................................. G02B 7/02
[52] U.S. Cl. ..................................... 350/245; 350/634
[58] Field of Search ................ 350/245, 247, 252, 634

[56] References Cited

U.S. PATENT DOCUMENTS

| | | |
|---|---|---|
| 2,689,102 | 9/1954 | Whalen . |
| 3,189,775 | 6/1965 | Fyler . |
| 3,204,471 | 9/1965 | Rempel . |
| 3,334,959 | 8/1967 | Walsh . |
| 3,424,413 | 1/1969 | Applegate ........................... 350/634 |
| 3,511,462 | 5/1970 | Dousseau de Bazignan . |
| 3,588,025 | 6/1971 | Gersman . |
| 3,588,230 | 6/1971 | De Rieux . |
| 3,588,232 | 6/1971 | Mostel . |
| 3,642,353 | 2/1972 | Field . |
| 3,756,549 | 9/1973 | Lange . |
| 4,088,396 | 5/1978 | Edelstein . |
| 4,099,852 | 7/1978 | Kobierecki et al. . |
| 4,226,569 | 10/1980 | Gerard et al. . |
| 4,304,385 | 12/1981 | Farouche et al. . |
| 4,408,830 | 10/1983 | Wutherich . |
| 4,423,850 | 1/1984 | Bass . |

*Primary Examiner*—John K. Corbin
*Assistant Examiner*—Loha Ben
*Attorney, Agent, or Firm*—Scully, Scott, Murphy & Presser

[57] ABSTRACT

The specification discloses a mount for an optical device having 6 degrees of freedom; three translations along the x, y and z axes and three pivotal or rotational movements about each of the axes. The mount is particularly useful in mounting scanning cameras, robotic eyes, or correlating image or pattern recognition devices for use in self-guided missiles. When used in free-flight, the three pivotal or rotational movements correspond to pitch, roll, and yaw. A semi-spherical drive means which is rotatably journaled in a complimentary semi-spherical fixed mount. The drive means defines an optical axis within having interior threads. A first carrier is threaded into the drive means and translated along the z axis by rotation of the spherical drive means. A second carrier is mounted for x, y translation within the first carrier. Pivotal or rotational movement about the x and y axes may occur between the first carrier of the drive hemisphere, or between the drive hemisphere and the fixed mount. Roll movement about the z axis occurs between the first carrier and the fixed mount.

38 Claims, 5 Drawing Figures

MULTI-DEGREE OF FREEDOM MOUNT

FIELD OF THE INVENTION

The present invention is a mount for an optical device having six degrees of freedom and is intended for use in optical systems such as an optical correlator, a scanning television camera, a robotic eye, or optical bench systems involving mirrors, lenses, or light sources such as lasers or other optical components.

BACKGROUND OF THE INVENTION

The prior art devices used for supporting and centering optical components generally provide separate means for translating the component along the x, y and z axes, and for pivoting the component about the x and y axes. While these devices are suitable for use in optical bench systems, where space is not at a premium, they are generally unsuitable for military or industrial applications wherein a plurality of optical components must be closely fitted together in a closely defined relationship.

For example, U.S. Pat. No. 3,511,462 entitled "Device for the Supporting and Centering of Components" discloses an optical bench mount having a set of gimbals to provide for pivotal movement, and three separate carriages to provide for translation along the x, y and z axes. This device provides for 5 degrees of movement, three translations, and two angular pivots.

U.S. Pat. No. 4,099,852 discloses a "Lens Positioner With 5 Degrees Of Freedom" which also provides for three translations and two angular rotations. This device uses five micrometer heads or motorized linear actuators to translate a lens about three axis, and two angular rotations.

U.S. Pat. No. 4,088,396 discloses an "Optical Mount With Independently Orthogonally Adjustable Element" which provides for 2 degrees of rotational freedom about orthogonal axis by means of a semi-spherical mount, and a pair of adjusting screws which pivot the semi-spherical component with respect to the base. This reference also discloses screw threads and an internal optical passageway within the semi-spherical mount. The reference does not disclose the use of these screw threads for translation along a z axis.

Danish patents No. 63 545 entitled "Vinkelindstillelig Objektivfatning" also uses semi-spherical mounts and orthogonally located adjusting screws for pivoting one of the semi-spherical components with respect to the other to thereby provide rotational pivots about an optical axis.

This reference also discloses the use of external screw threads for adjusting the tension between these semi-spherical elements, but does not disclose the use of screw threads for positioning any optical component along a z axis.

U.S. Pat. No. 3,588,230 entitled "Adjustable Lens Mount" and U.S. Pat. No. 4,408,830 entitled "Multi-Directional Translator Mechanism" disclose mechanisms which provide translation along an x and a y axis for optical components such as mirrors, lenses, prisms, and the like. U.S. Pat. No. 4,408,830 also discloses a carrier which is resiliently biased to a predetermined position by means of adjusting screws.

U.S. Pat. No. 3,204,471 entitled "Angle Adjusting Mechanism For Optical Elements" and U.S. Pat. No. 3,588,232 entitled "Precision Adjustable Assembly For An Optical Bench Mark" disclose gimbal devices that may be fixably positioned for pivotable movement about an axis by means of adjustable studscrews. U.S. Pat. No. 3,204,471 is resiliently biased to a predetermined position by a combination of the torsion springs and the adjusting screws.

U.S. Pat. No. 3,642,353 discloses an optical mirror assembly which is positioned by means of semi-spherical bearing surfaces and retained in position by means of a wave spring. The mirror may be pivoted about x and y axes by means of a set of adjusting screws which pivots the mirror assembly.

None of the foregoing devices are able to provide translation in all three axis, and rotation about each of the axis to provide 6 degrees of freedom or movement in the mount.

Traditionally, any device capable of translation in each of the x, y and z axes requires a minimum of three moving parts, and a gimbal or similar device providing 2 degrees of pivotal or rotational freedom about two axis also requires three moving parts. The present invention will provide 4 degrees of motion with three component parts, and 6 degrees of motion with four moving parts.

SUMMARY OF THE INVENTION

The present invention is a precision mount for optical use having 6 degrees of freedom, translation along three orthogonal axes x, y and z, and rotation about each axis. A base mount is provided with a spherically contoured receiving surface into which is journaled or fitted a mating drive means which rotates within the receiving surface. The drive means defines an internally threaded screw thread which surrounds an optical passageway. A first carrier having external screw threads engages the internal screw threads of the spherically contoured drive means and is translated along the optical axis or the z axis in response to rotation of the spherical drive means or other means to achieve translation along "z" axis. The second carrier is mounted within the first carrier to provide for translation along the x and y axes within the first carrier. Rotational movement about each of the axis may be provided between the first carrier and the semi-spherical drive means, or in the alternative, rotation about the x and y axes may be provided by pivoting a semi-spherical drive means within the semi-spherical receiving surface. In either case, rotational movement about the z axis is provided by rotating the first carrier with respect to the semi-spherical drive means.

An optical means is mounted on the second carrier. If desired, the optical means may be extended forwardly within the optical passageway to the pivot point or radius of the semi-spherical surface. At this location, the optical means may be rotated about each of the three axes, with zero linear movement because the light beam of the optical means is allowed to go through the center of the mount. Any optical component can thereby be mounted at the center of rotation for each of the three optical axes. If desired, the optical component can then be translated along the x, y or z axis as desired.

Because of the manner in which the device is constructed, the invention provides a multi-degree of freedom mount for optical components that require adjustment and occupy a minimum amount of space. The invention is particularly useful for active optical components such as robotic eyes, target seeking missiles, scanning television cameras and moving reflectors. The device is also applicable to any optical system which requires or needs multi-degree of freedom adjustment. This includes optical bench systems using prisms, lenses, mirrors or light sources such as laser beams. The device is also particularly useful for use in one or more optical correlators used in pattern recognition systems.

In addition, by adding several drive motors, the device can be used in an active optical system used to match and identify parts, shapes, structures, terrain and targets.

The device is unique in that three components of the mount utilizing the threaded spherically contoured drive and mount can result in 3 degrees of motion while using a minimum of space. The mount can tilt or pivot the optical device about each of the x and y axes for scanning purposes, while simultaneously translating the optical component along the z axis to provide focusing ability in an active optical system. This device also has the unique feature that the center of rotation can be arbitrarily chosen or varied by changing the radius of curvature of the spherically contoured surfaces.

In a second embodiment, a first and second spherically contoured support means are adapted for rotational movement therebetween. The first support also defines a threaded opening therein which surrounds a z rotational axis and the pivot point. A first carrier having threads thereon engages the threaded opening and translate the carrier along the z rotational axis in response to rotation of the first spherically contoured support means. The first carrier defines an optical opening therein. The second carrier may be mounted within the first carrier with the second carrier also defining a support within the optical opening for an optical means. An x and a y translation means for translating the second carrier with respect to the first carrier along a z and a y axis is provided. In addition, adjustable means are provided for pivoting the first carrier about the pivot point to thereby rotate the first and second carrier about each of the x and y axes. Rotation about the z axis is provided by rotating the first carrier with respect to the first semi-spherical support means. As indicated previously, the adjustable means which provides rotation about the x and y axes may accomplish this result by pivoting the first spherically contoured support means with respect to the second, or by tilting the first carrier with respect to the first spherically contoured support means.

In one embodiment of the invention, the first and second carrier are resiliently mounted in a biased or predetermined position by adjustment screws. In an alternate embodiment of the present invention, the adjustment screws are rotated by servomotors which provide positive displacement of the respective component parts in response to rotation of the servomotors. Additionally, linear stepping motors could be provided to effect the relative positioning of the parts. The device is particularly useful for positioning a photosensitive optical device such as a television camera or a charge coupled device. In addition, the device may be used to correlate or position a mirror, lens, or laser beam as desired, or two or more devices may be used to align a correlator, with its holographic fourier transform lens and its array of matched filters.

BRIEF DESCRIPTION OF THE PREFERRED EMBODIMENTS

Figure 1:
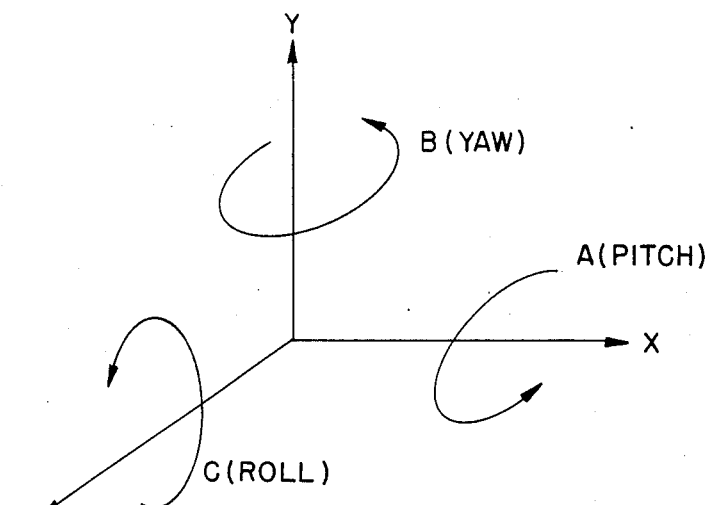
FIG. 1 is a sketch illustrating the x, y and z orthogonal axes, and the yaw, pitch, and roll movements about each of the axes that will be used in explaining the operation of the mount.

As illustrated in FIG. 1, the present invention provides translation along each of the x, y and z axes, and rotation about each of these axes to provide pitch, yaw and roll adjustment. Each of the x y and z axes are generally orthogonal to each other, and the device normally provides 3 degrees of rotational movement. The translation adjustment and the degree of rotation of freedom is governed by the relative sizing and spacing of the components, and as will hereinafter be described, can be assembled with a wide variety of spacing adjustments.

Figure 2:
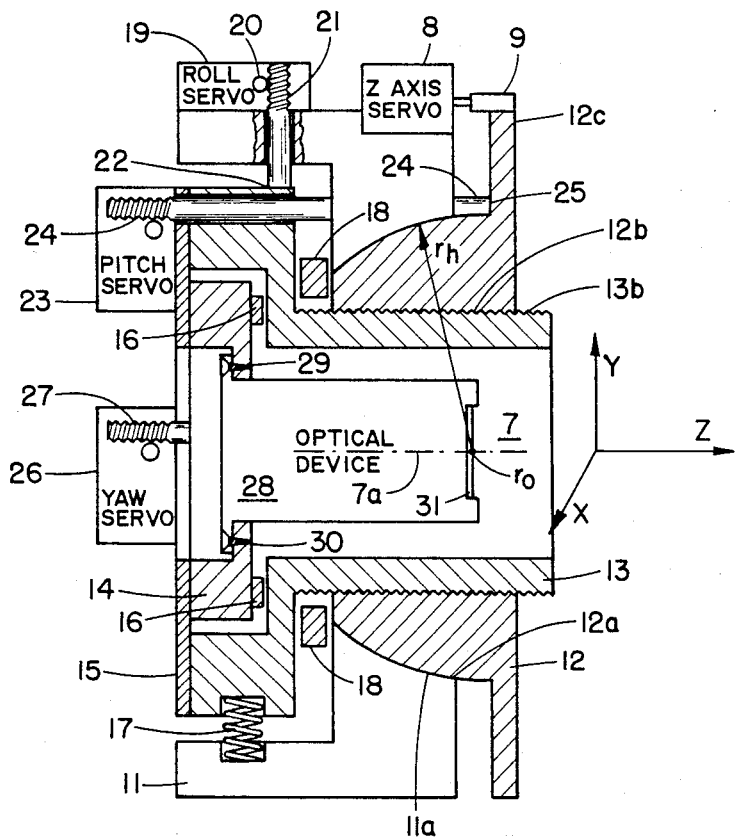
FIG. 2 is a partial cross-section of one embodiment of the present invention illustrating a section of the device along the y and z axes.

As illustrated in FIG. 2, one embodiment of the invention is illustrated in a cross sectioned elevation sideview along a plane defined by the y and z axes.

As illustrated in FIG. 2, a base member 11 is provided for mounting the mount to a fixed surface. Base member 11 defines a spherically contoured receiving surface 11a which receives a spherically contoured drive means 12 mounted within the receiving surface. The spherically contoured drive means defines an internal screw thread 12b. A first carrier 13 having external screw threads 13b threadably engages the semi-spherical drive means 12 for translation of the first carrier 13 along the z axis as illustrated in FIG. 2. The spherically contoured drive means 12 may be rotated by means of the z axis servo 8 which rotates a drive roller 9 which engages the outer drive flange 12c of the spherically contoured drive means. Rotation of the y axis servo advances the first carrier 13 along the z axis by virtue of threads 12b and 13b. A second carrier 14 is mounted within the first carrier 13 for translation along the x and y axes as will hereinafter be more fully described with respect to FIGS. 3 and 4. The second carrier is retained within the first carrier by means of flange 15 and wave spring 16. The first drive means is also resiliently mounted by virtue of spring 17 and wave spring 18 and biased to predetermined positions by means of adjustment screws 21, 25, and 27. The adjustment screw 21 is rotated and driven downwardly by means of drive gear 20 and roll servo 19 to engage the first carrier as indicated at 22. Likewise, drive screw 24 is driven by pitch servo 23 to engage the outer drive flange 12c as indicated at 25. In a similar manner, drive screw 27 is driven by yaw servo 26 to also react between (not shown) base member 11 and outer drive flange 12c through clearance hole in 12B.

The mount defines an optical passageway 7 and optical axis 7a having a central pivot point $r_o$ and a semi-spherical radius $r_h$ which define the neutral point of the mount. Mounted within the optical passageway 7 is an optical device 28 which is secured to the second carrier 14 by means of screws 29 and 30. The optical device is generally representative of any photosensitive device, and may be a conventional vidicom, or a charge coupled device. The optical component 31 is normally mounted at $r_o$ to provide for zero linear displacement of the optical component in response to rotation about each of the x, y and z axes.

Figure 3:
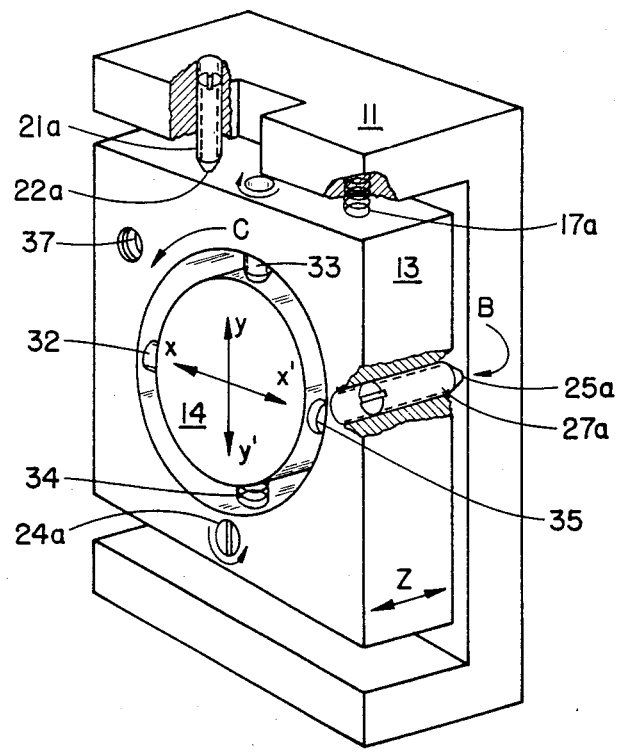
FIG. 3 is an isometric and diagrammatic view of a second embodiment of the second invention illustrating the translation along each of the axis, and the pitch, yaw, and roll adjusting screws.

As illustrated in FIG. 3, the x and y translation adjustments are accomplished by means of adjusting screws 32 and 33 which translate the second carrier 14 with respect to the first carrier 13. The second carrier also provides a mounting means for the optical device to be mounted. The second carrier 14 may be resiliently biased into position by means of springs 34 and 35 and held in a predetermined position by means of lead screws 32 and 33. Alternately, wave springs such as those illustrated at 16 in FIG. 2 and at 16 and 25 in FIG. 5 may be used. Rotation of the lead screw 32 results in translation of the second carrier 14 along the x-x' axis. Likewise, rotation of the lead screw 33 results in translation of the second carrier along the y-y' axis. As was previously indicated with respect to FIG. 2, rotation of the semi-spherical drive means 12 results in translation of the first carrier, and consequently the second carrier, along the z axis.

Rotation about each of the axes is accomplished in the embodiment illustrated in FIG. 3 by displacing the first carrier 13 with respect to the base member 11. Rotation about the z axis (roll) is accomplished by advancing lead screw 21a downwardly into engagement with the first carrier 13 as indicated at 22a. The first carrier 13 is resiliently biased downwardly on the opposite side of center by means of spring 17a. Center, as the term is used in FIG. 3, would refer to the center of rotation of the screw threads 12b, 13b (illustrated in FIG. 2). As lead screw 21a is advanced, it rotates the first carrier 13 in the direction indicated by the arrow c (roll) about the z axis.

Likewise, lead screw 27a is advanced inwardly to engage the support base 11 as indicated at 25a to provide yaw adjustment about the y axis. A spring such as 37, which is similar to the spring 17b illustrated in FIG. 4, or a wave spring (such as spring 25 illustrated in FIG. 5) may be used to resiliently bias the first carrier 13 and lead screw 27a into engagement with the base member 11.

Likewise, lead screw 24a also engages base member 11 (not shown) to provide pitch adjustment about the x axis as illustrated in FIG. 3.

Figure 4:
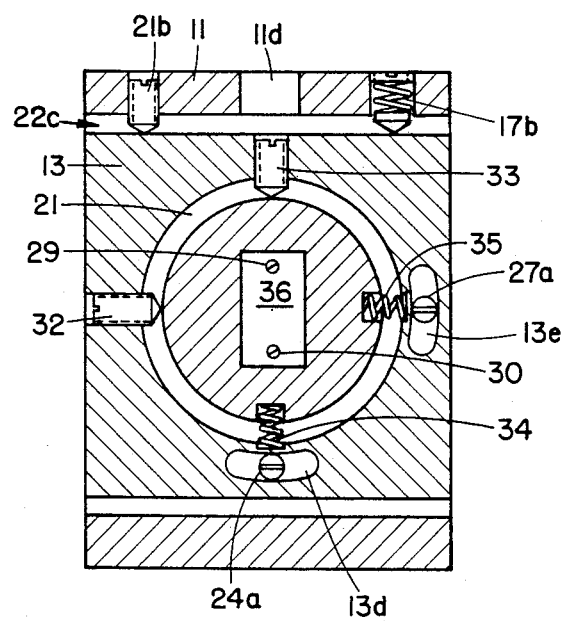
FIG. 4 is a rear plan view of still another embodiment of the present invention illustrating x and y translation adjustments, the roll adjustment, and the location of the pitch and yaw adjustment screws.
Figure 5:
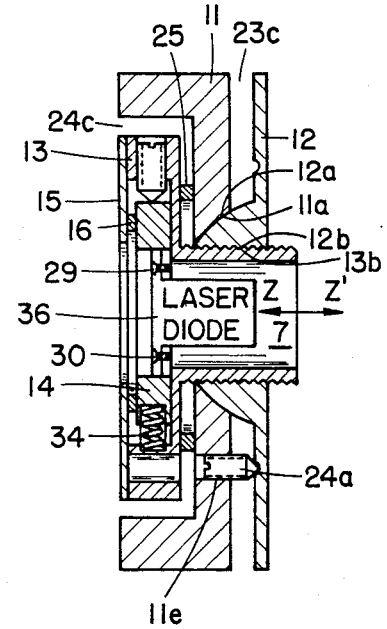
FIG. 5 is a partial cross-section side view of the device illustrated in FIG. 4 illustrating the translation along the z axis and the pitch and yaw adjustment screws.

An alternate embodiment of the invention is illustrated in FIGS. 4 and 5. In this embodiment, the yaw and pitch adjustments are achieved by displacing semi-spherical drive means 12 with respect to the base member 11. The lead screw 24a threadably engages the base member 11 as indicated in 11e to bias the semi-spherical drive member 12 outwardly and thereby achieve rotation about the x axis (pitch). Likewise, lead screw 27a (illustrated only in FIG. 4) threadably engages the base member 11 (not shown) to engage the semi-spherical drive member 12 at a point 90 degrees from the pitch adjustment screw 24a. By adjustment of lead screws 24a and 27a, yaw and pitch adjustments may be made about the semi-spherical surfaces 12a and 11a. Inasmuch as the first carrier 13 is rotated about the center of rotation $r_o$ by means of lead screw 21b, elongate slots 13d, 13e are provided to enable access to the pitch adjustment screw 24a, and the yaw adjustment screw 27a. Roll adjustment is biased by means of a spring loaded member 17b which threadably engages base member 11 as indicated in FIG. 4. In general, cutaways are provided as indicated at 11d, 13d, 13e to provide access to the adjustment screws where necessary.

In the embodiment illustrated in FIGS. 4 and 5, a laser diode has been mounted within the optical passageway 7 as illustrative of the manner in which the mount might be utilized in an optical bench device. Laser diode 34 is mounted in the second carrier 14 by means of screws 29 and 30.

As can be seen in FIGS. 4 and 5, the mount provides 6 degrees of freedom in the optical components in a configuration that occupies a minimum amount of space. As illustrated, the device generally provides for 3 degrees of rotation about each of the x, y and z axes with zero linear movement, but as would be apparent to one skilled in the art, the amount of rotational movement available is determined by the clearance space provided. As indicated in FIG. 4, the size of the clearance space 21 determines the amount of x and y translations available. Clearance space 22a effectively limits the amount of roll adjustment, while the length of the barrel or threaded portion of the first carrier 13b effectively limits the amount of z translation. As illustrated in FIG. 5, the clearance space 23c and/or 24c effectively limits the amount of yaw and pitch adjustment about the x and y axes. As indicated in FIG. 5, wave springs 16 and 25 provide a resilient bias for rotational movement by virtue of the solid coupling between the first carrier 13 and the semi-spherical drive means 12 by means of the threaded connection. The action of lead screw 24a is opposed by wave spring 25 acting between base member 11 and the first carrier 13.

The foregoing description of the optical mount is intended to illustrate the invention in sufficient detail to enable those skilled in the art to practice and use the invention. Various modifications and alterations may be apparent to those skilled in the art to adapt the mount to a specific art environments. The foregoing description of the various embodiments is not intended in anyway to be an exhaustive description of the invention, which is to be described and limited only in accordance with the following claims.

I claim:

1. A precision mount having 6 degrees of movement, said mount comprising:
    (a) a base member having a semi-spherical receiving surface,
    (b) a semi-spherical drive means mounted within said receiving surface, said semi-spherical drive means defining an internal screw thread,
    (c) a first carrier having an external screw thread for engaging the internal thread of said semi-spherical drive means and translating the carrier along a z axis in response to rotation of said semi-spherical drive means, said drive means and said first carrier defining an optical axis generally congruent with said z axis,
    (d) a second carrier mounted within said first carrier for translation along an x and a y axis within said first carrier, said x, y and z axes being generally orthogonal to each other,
    (e) optical means mounted on said second carrier, (f) means for rotating said first carrier about each of the x, y and z axes to rotate said optical means about each of said axes, whereby said optical means may be rotated about and translated along each of the x, y and z axes.

2. A precision mount as claimed in claim 1 wherein said means for rotating the first carrier about the x and y axes tips the first carrier with respect to said base member.

3. A precision mount as claimed in claim 1 wherein said means for rotating the first carrier about the x and y axes pivots the semi-spherical drive means with respect to said base.

4. A precision mount as claimed in claim 1 which further includes x and y drive screws between said first and second carriers for effecting x and y translations of the second carrier.

5. A precision mount as claimed in claim 4 wherein the x and y drive screws and the semi-spherical drive means are rotated by servomotors.

6. A precision mount as claimed in claim 1 or 2 or 3 or 4 or 5 wherein the first and second carriers are resiliently mounted and biased to predetermined positions by adjusting screws.

7. A precision mount as claimed in claim 1 or 2 or 3 or 4 or 5 wherein said optical means is a light source.

8. A precision mount as claimed in claim 7 wherein said light source is a laser.

9. A precision mount as claimed in claim 1 or 2 or 3 or 4 or 5 wherein said optical means is a television camera.

10. An optical correlator having rotational and translational freedom, said correlator comprising:
(a) first and second semi-spherical support means adapted for rotational movement therebetween, said first support defining a z rotational axis and a pivot point, said first support also defining a threaded opening which surrounds said rotational axis and said pivot point,
(b) a first carrier having an exterior thread which engages said threaded opening and translates said carrier along said z rotational axis in response to rotation of the first semi-spherical support means, said first carrier defining an optical opening therein,
(c) a second carrier mounted within said first carrier, said second carrier defining a support within said optical opening for an optical means,
(d) an x and a y translation means for translating said second carrier with respect to said first carrier along an x and a y axis, said x, y and z axes being generally orthogonal to each other,
(e) adjustment means for pivoting said first carrier about said pivot point.

11. An optical correlator as claimed in claim 10 wherein said adjustable means pivots said first carrier with respect to said second semi-spherical support means.

12. An optical correlator as claimed in claim 10 wherein said adjustable means pivots said first semi-spherical support means with respect to said second semi-spherical support means.

13. An optical correlator as claimed in claim 10 which also includes means for rotating said first carrier with respect to said first semi-spherical carrier.

14. An optical correlator as claimed in claim 11 or 12 which further includes means for rotating said first carrier with respect to said first semi-spherical carrier.

15. An optical correlator as claimed in claim 10 or 11 or 12 or 13 in which said adjustable means and said translation means are driven by servomotors.

16. An optical correlator as claimed in claim 10 or 11 or 12 or 13 in which said first and second carriers are resiliently mounted and biased to predetermined positions by adjustment screws.

17. An optical correlator as claimed in claim 10 or 11 or 12 or 13 in which said optical means is a photosensitive device.

18. An optical correlator as claimed in claim 17 in which said photosensitive device is a television camera.

19. An optical correlator as claimed in claim 17 in which said photosensitive device is a charge coupled device.

20. An optical correlator as claimed in claim 10 or 11 or 12 or 13 in which said optical means is a mirror.

21. An optical correlator as claimed in claim 10 or 11 or 12 or 13 in which said optical means is a lens.

22. An optical correlator as claimed in claim 10 or 11 or 12 or 13 in which said optical means is a light source.

23. An optical correlator as claimed in claim 22 in which said light source is a laser.

24. An optical mount having rotational and translational freedom, said mount comprising:
(a) first and second semi-spherical support means adapted for rotational movement therebetween, said first support defining a z rotational axis and a pivot point, said first support also defining a threaded opening which surrounds said rotational axis and said pivot point,
(b) a first carrier having an exterior thread which engages said threaded opening and translates said carrier along said z rotational axis in response to rotation of the first semi-spherical support means, said first carrier defining an optical opening therein,
(c) a mounting means mounted within said first carrier, said mounting means defining a support within said optical opening for an optical means,
(d) adjustable means for pivoting said first carrier about said pivot point.

25. An optical mount as claimed in claim 24 wherein said mount further comprises and x and a y translation means for translating said mounting means with respect to said first carrier along an x and a y axis.

26. An optical mount as claimed in claim 25 wherein said adjustable means pivots said first carrier with respect to said second semi-spherical support means.

27. An optical mount as claimed in claim 25 wherein said adjustable means pivots said first semi-spherical support means with respect to said second semi-spherical support means.

28. An optical mount as claimed in claim 25 which also includes means for rotating said first carrier with respect to said first semi-spherical carrier.

29. An optical mount as claimed in claim 26 or 27 which further includes means for rotating said first carrier with respect to said first semi-spherical carrier.

30. An optical mount as claimed in claim 24 or 25 or 26 or 27 or 28 in which said adjustable means and said translation means are driven by servomotors.

31. An optical mount as claimed in claim 24 or 25 or 26 or 27 or 28 in which said first carrier and said mounting means are resiliently mounted and biased to predetermined positions by adjustment screws.

32. An optical mount as claimed in claim 25 or 26 or 27 or 28 in which said optical means is a photosensitive device.

33. An optical mount as claimed in claim 32 in which said photosensitive device is a television camera.

34. An optical mount as claimed in claim 32 in which said photosensitive device is a charge coupled device.

35. An optical mount as claimed in claim 25 or 26 or 27 or 28 in which said optical means is a mirror.

36. An optical mount as claimed in claim 25 or 26 or 27 or 28 in which said optical means is a holographic lens.

37. An optical mount as claimed in claim 25 or 26 or 27 or 28 in which said optical means is a light source.

38. An optical mount as claimed in claim 37 in which said light source is a laser.

* * * * *